United States Patent [19]
Neal et al.

[11] Patent Number: 6,119,191
[45] Date of Patent: Sep. 12, 2000

[54] PERFORMING PCI ACCESS CYCLES THROUGH PCI BRIDGE HUB ROUTING

[75] Inventors: Danny Marvin Neal, Round Rock; Steven Mark Thurber, Austin, both of Tex.

[73] Assignee: International Business Machines Corporation, Armonk, N.Y.

[21] Appl. No.: 09/144,869

[22] Filed: Sep. 1, 1998

[51] Int. Cl.[7] .......................... G06F 13/40; G06F 13/00; G06F 3/00

[52] U.S. Cl. ..................... 710/128; 710/129; 710/8; 710/104

[58] Field of Search .................. 710/126–132, 710/104, 8–14

[56] References Cited

U.S. PATENT DOCUMENTS

| | | | |
|---|---|---|---|
| 5,379,384 | 1/1995 | Solomon | 710/128 |
| 5,446,869 | 8/1995 | Padgett et al. | 395/500.48 |
| 5,499,346 | 3/1996 | Amini et al. | 710/128 |
| 5,542,055 | 7/1996 | Amini et al. | 710/101 |
| 5,557,758 | 9/1996 | Bland et al. | 710/128 |
| 5,568,619 | 10/1996 | Blackledge et al. | 710/101 |
| 5,634,073 | 5/1997 | Collins et al. | 710/5 |
| 5,664,124 | 9/1997 | Katz et al. | 710/129 |
| 5,692,219 | 11/1997 | Chan et al. | 710/49 |
| 5,724,528 | 3/1998 | Kulik et al. | 710/128 |
| 5,729,760 | 3/1998 | Poisner | 710/3 |
| 5,734,847 | 3/1998 | Garbus et al. | 710/128 |
| 5,751,975 | 5/1998 | Gillespie et al. | 710/126 |
| 5,857,084 | 1/1999 | Klein | 395/309 |
| 5,859,987 | 1/1999 | Gillespie et al. | 395/308 |
| 5,864,688 | 1/1999 | Santos et al. | 395/309 |
| 5,867,728 | 2/1999 | Melo et al. | 710/8 |
| 5,892,977 | 4/1999 | Nakamura | 710/21 |
| 5,983,303 | 11/1999 | Sheafor et al. | 710/126 |

*Primary Examiner*—Ayaz R. Sheikh
*Assistant Examiner*—Sumati Lefkowitz
*Attorney, Agent, or Firm*—Robert V. Wilder; Leslie A. Van Leeuwen

[57] ABSTRACT

A method and implementing computer system is provided in which PCI CONFIG_ADDRESS and CONFIG_DATA conventions are maintained in a large computer system and each PCI Host Bridge (PHB) CONFIG_ADDRESS register and each PHB CONFIG_DATA register have separate and system-unique addresses. In one example, the operating system provides a service to translate the device driver's configuration operation to a particular bus and device in the system, to a particular CONFIG_ADDRESS or CONFIG_DATA register of the PHB which has that device under it. By using this method, the hierarchical system can use architecture-independent routing of addresses down to the PHB that contains the appropriate CONFIG_ADDRESS and CONFIG_DATA registers.

10 Claims, 5 Drawing Sheets

PERFORMING PCI ACCESS CYCLES THROUGH PCI BRIDGE HUB ROUTING

FIELD OF THE INVENTION

The present invention relates generally to information processing systems and more particularly to a system PCI architecture which is scalable from small to large computer systems.

BACKGROUND OF THE INVENTION

In computer systems, the PCI (peripheral component interconnect) architecture defines a method to do configuration of PCI devices connected within the system whereby each PHB (PCI Host Bridge) has a CONFIG_DATA and a CONFIG_ADDRESS register. The address of each particular PCI device is set into the CONFIG_ADDRESS register of the PHB "above" the PCI device, and then "read" ("load") and "write" ("store") operations are done to the PHB CONFIG_DATA register which acts as a data port to the corresponding PCI devices "below" the corresponding PHBs.

In addition, the method describes that all PHBs are to "watch" for a write request to a particular address, and when such write operations are detected, the PHBs "stuff" the data into the CONFIG_ADDRESS register of the PHB but no response is made to the write request, except by one PHB in the system which is designated to respond. Pulling data off the bus as the data "flies by" and not actually responding to the sender is sometimes referred to in the art as "snarting". When the write or read operation is performed to the single address designated for the CONFIG_DATA register, all PHBs "see" this operation and if the contents of the particular PHB's CONFIG_ADDRESS register indicate that the particular operation is destined for a PCI device "beneath" that PHB, then that PHB responds to the operation.

That approach assumes that all PHBs are on a common system bus. However, this is not the case in large hierarchical systems. In such systems, "address decodes" are used at various places to direct an operation to its final destination. Such routing decodes need to be architecture-independent and therefore such systems cannot do a "broadcast" of a PCI CONFIG_DATA or CONFIG_ADDRESS register operation so that all PHBs in the system "see" the operation.

Thus there is a need for an enhanced PCI configuration system and methodology which is scalable for use in large hierarchical computer systems.

SUMMARY OF THE INVENTION

A method and implementing computer system configuration is provided in which a hub circuit is connected between a system bus and a plurality of PCI Host Bridge circuits. In an exemplary embodiment, each PCI host bridge circuit contains separate configuration address and configuration data registers and each register has a separate address in memory. Configuration cycle accesses to target PCI devices below the PCI host bridges are routed to the appropriate PCI host bridge through system address decode routing logic in the hub circuit. By using this method, hierarchical systems can use architecture-independent routing of addresses down to the target PCI Host Bridge circuit to the target PCI device being accessed.

BRIEF DESCRIPTION OF THE DRAWINGS

A better understanding of the present invention can be obtained when the following detailed description of an exemplary embodiment is considered in conjunction with the following drawings, in which.

DETAILED DESCRIPTION

Figure 1:
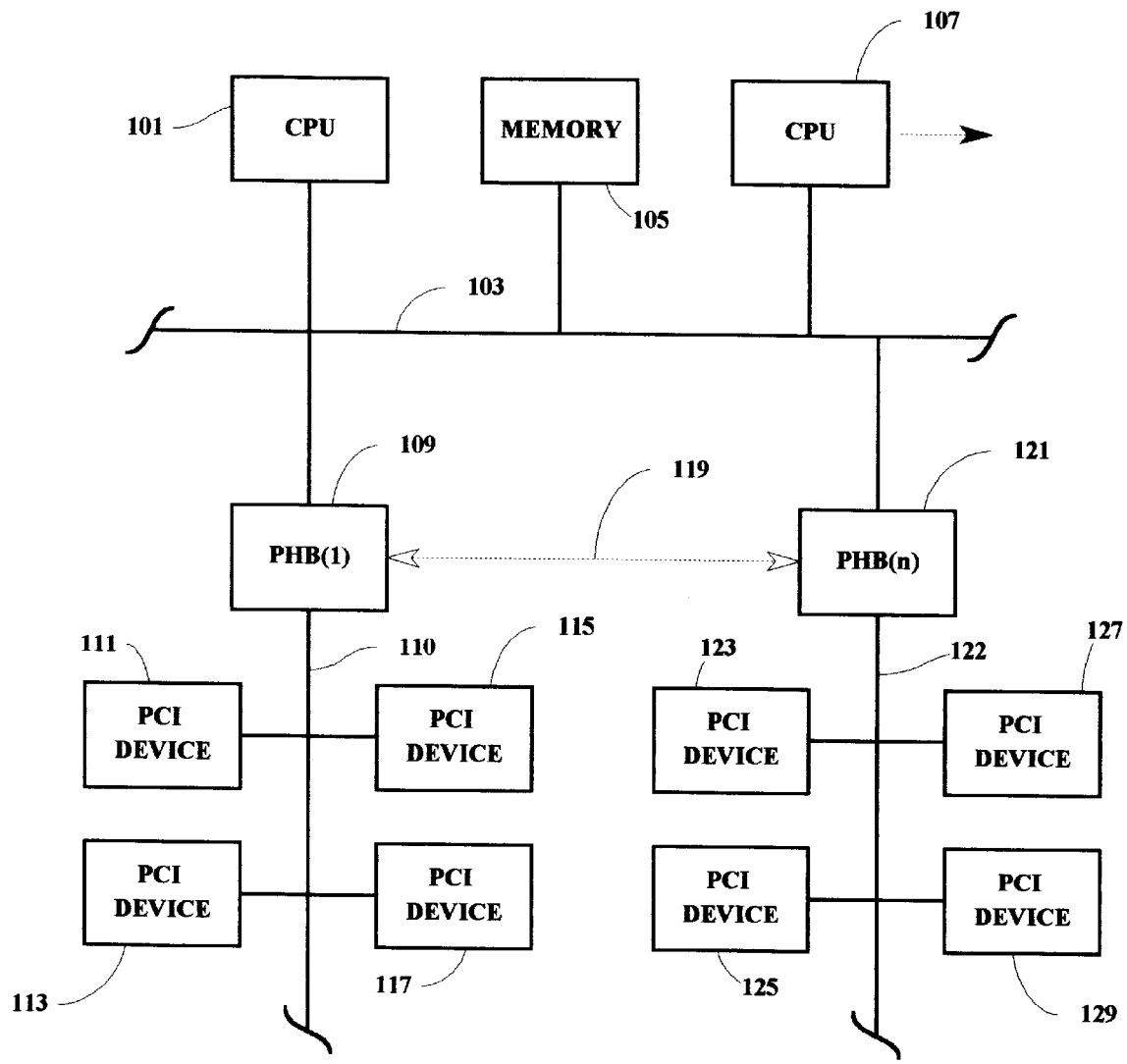
FIG. 1 is a diagram of a prior art computer system and a PCI architecture.

The various methods discussed herein may be implemented within a typical computer system which may be, for example, a workstation or personal computer or larger computer system. In general, an implementing computer system may include a plurality of processors in a multi-bus system, in a network of similar systems. However, since the workstation or computer system implementing the present invention in an exemplary embodiment, is generally known in the art and composed of electronic components and circuits which are also generally known to those skilled in the art, circuit details beyond those shown in the drawings are not specified to any greater extent than that considered necessary as illustrated, for the understanding and appreciation of the underlying concepts of the present invention and in order not to obfuscate or distract from the teachings of the present invention.

In FIG. 1, a computer system includes a CPU (central processing unit) 101 connected to a system bus 103. Also connected to the system bus 103 is a memory unit 105. The computer system may also include additional CPUs such as CPU 107 and other subsystems and network connections which may be connected on extended portions of the bus 103. A first PHB (PCI Host Bridge) circuit 109 is connected to the system bus 103 and is also connected to a first PCI bus 110. Four PCI devices 111, 113, 115 and 117 are shown connected to the PCI bus 110 which may also have additional PCI devices connected thereto. The illustrated system may have a plurality 119 of PHB circuits connected to the system bus 103 of which PHB-(n) 121 represents the last one of a series including "n" PHB circuits. PHB(n) also connects the system bus to a PCI bus 122 to which are connected additional PCI devices 123, 125, 127 and 129. Additional PCI devices may also be connected to extended segments of the PCI bus 122.

Figure 2:
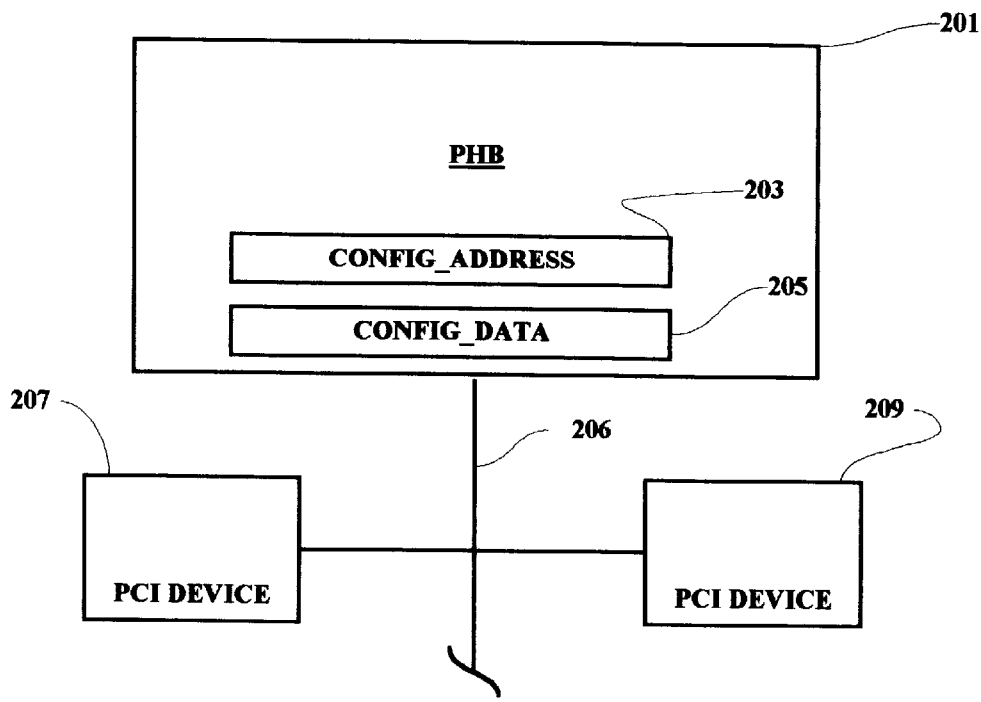
FIG. 2 is an illustration showing register locations in a typical PCI architecture.

FIG. 2 shows a PHB circuit 201 including a CONFIG_ADDRESS register 203 and a CONFIG_DATA register 205. The PHB 201 is connected to a PCI bus 206 which, in turn, is connected to a plurality of PCI devices 207 and 209 below the PHB 201.

Figure 3:
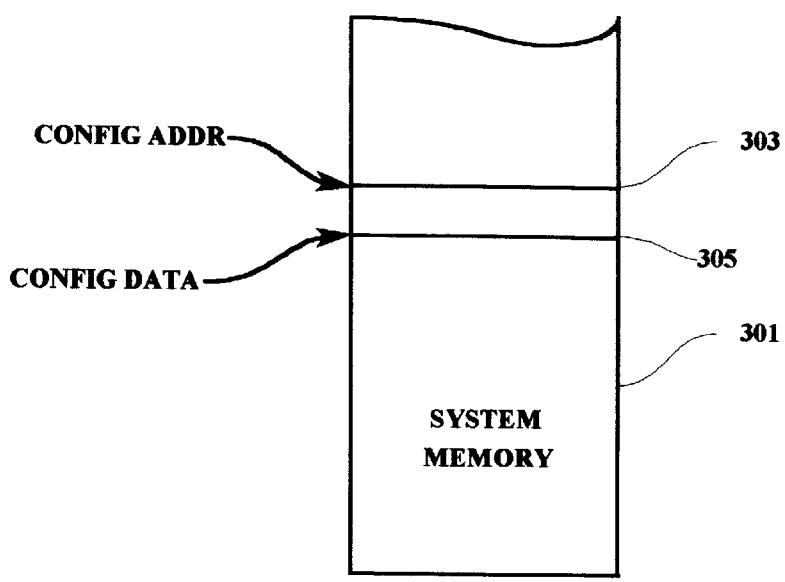
FIG. 3 is an illustration of system memory showing the system CONFIG_ADDRESS and CONFIG_DATA register addresses.

In FIG. 3, the system memory 301 is shown including a single address for the CONFIG_ADDRESS address and a separate single address for the CONFIF_DATA address.

There is only one CONFIG_ADDRESS address and one CONFIG_DATA address in memory for the entire prior art PCI system.

Figure 4:
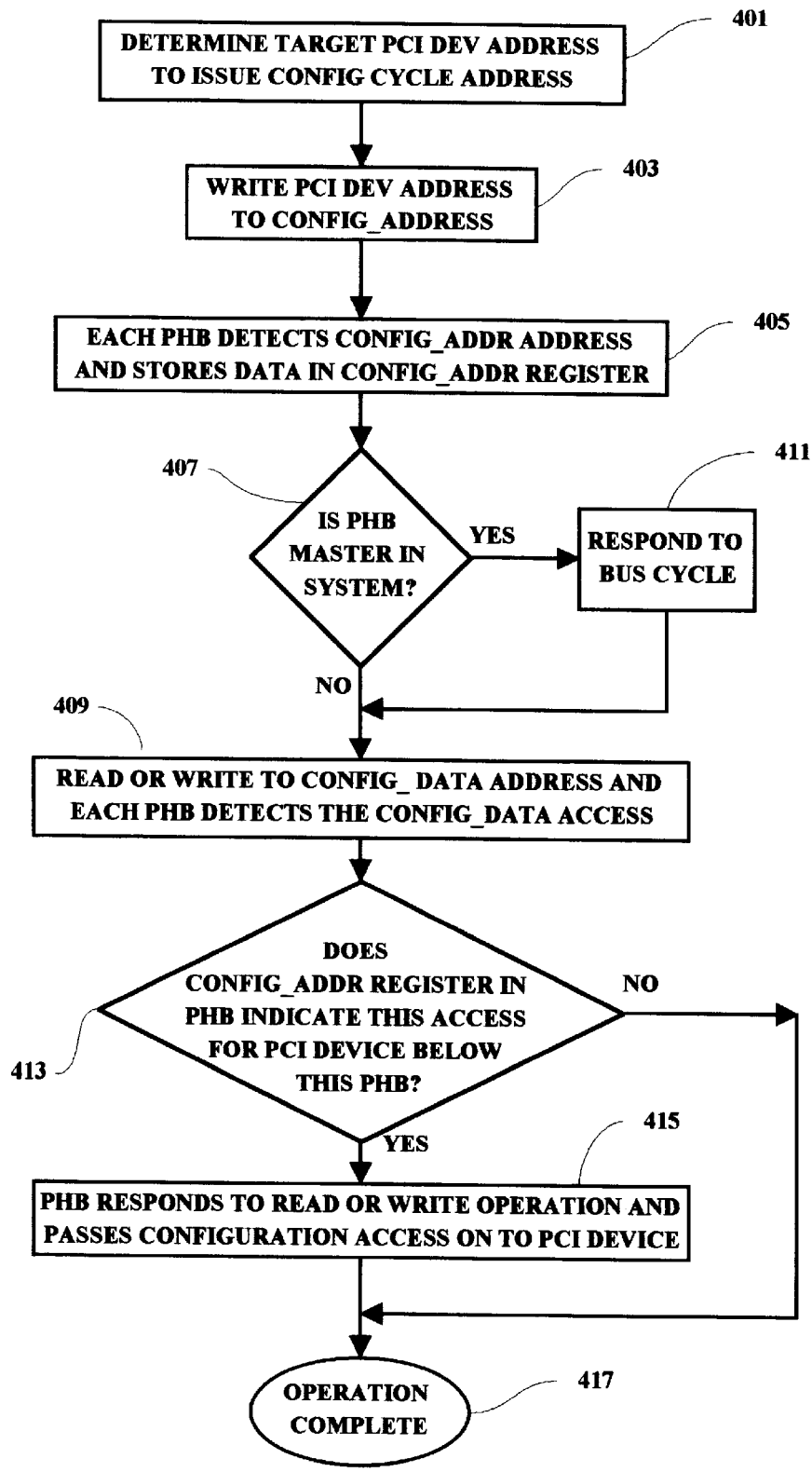
FIG. 4 is a flow chart illustrating an operational sequence of a typical prior art PCI configuration operation.

The system illustrated in FIG. 1 operates as shown in the flow chart of FIG. 4. First, the target PCI device address (which consists of the PCI bus number, the device number, the function number and the register number) to which to issue the configuration cycle address is determined 401. The CONFIG_ADDRESS register (one address for the entire system) is then written 403 with a value which represents the PCI bus number, the device number, the function number, and the register number of the device and register within the PCI device to which the next CONFIG_DATA register (one address for the entire system) is targeted. Next, each PHB detects 405 the CONFIG_ADDRESS address and stores data in the CONFIG_ADDRESS register. It is then determined if the PHB is a master device in the system 407, and if so, the master device (only) responds to the bus cycle 411. Next, the CONFIG_DATA register is then read or written 409 and all PHBs decode the CONFIG_DATA address along with the contents of the CONFIG_ADDRESS register. It is then determined whether the CONFIG_ADDRESS register in the PHB indicates that the targeted PCI device is located below that particular PHB 413. If so, the PHB responds to the read or write operation and passes 415 the configuration access on to the PCI device and the process is completed 417.

Figure 5:
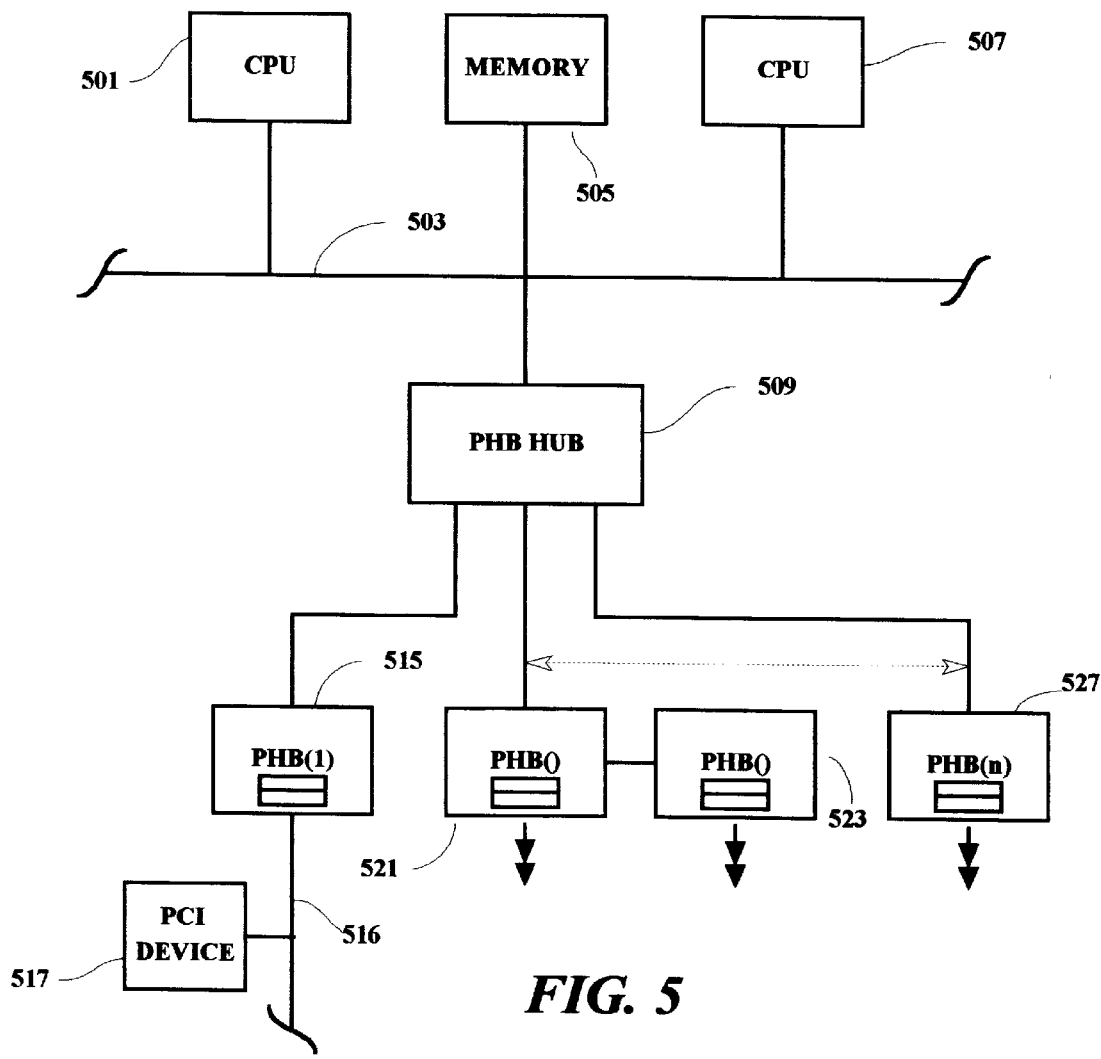
FIG. 5 is an block diagram of an exemplary computer system as implemented in accordance with the disclosed methodology.

The above describes a configuration operation in a PCI architected computer system. As hereinbefore noted, the above methodology does not readily apply to larger computer systems. An exemplary embodiment of a PCI architecture that may easily be applied to larger systems is illustrated in FIG. 5. As shown in FIG. 5, a CPU 501 is connected to a system bus 503. The bus 503 may also be connected to additional CPUs such as CPU 507, and extended for further connections to networks and other computer subsystems. A main PHB hub circuit 509 is shown connected between the system bus 503 and a plurality of PHB circuits such as PHBs 515, 521, and 527. Additional PHBs may also be connected to the hub 509, and other slave PHBs, such as PHB 523 may be connected to master PHBs such as PHB 521. Each PHB, such as PHB 515, includes a CONFIG_ADDRESS register and a CONFIG_DATA register, and each PHB is connected to a separate PCI bus, such as PCI bus 516, which, in turn, is connected to a plurality of PCI devices, such as PCI device 517.

Figure 6:
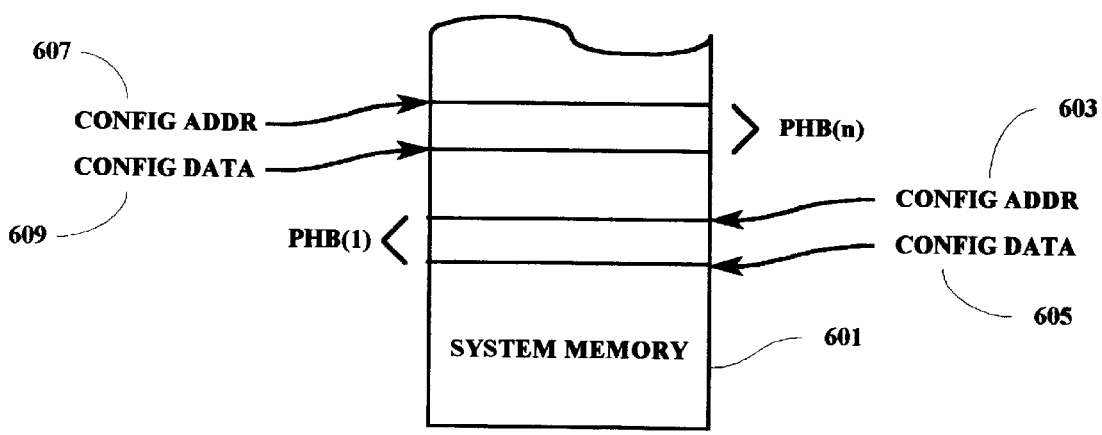
FIG. 6 is an illustration of system memory showing separate addresses for each PHB CONFIG_ADDRESS address and each PHB CONFIG_DATA address in the system.

As shown in FIG. 6, in the exemplary embodiment, the system memory 601 includes a separate memory address for each CONFIG_ADDRESS address and each CONFIG_DATA address for each PHB in the system. For example, PHB(1) has CONFIG_ADDRESS address 603 and CONFIG_DATA address 605, and PHB(n) has CONFIG_ADDRESS address 607 and CONFIG_DATA address 609. The hub circuit 509 includes address decoding circuitry by which configuration requests directed to a particular target PCI device are routed to the proper target PHB which has the target PCI device under it. The use of a separate hub 509 and separate PHB addressing for CONFIG_ADDRESS and CONFIG_DATA addresses in each PHB enables the implementation of architecture independent address encode routing which is used in larger computer systems, particularly hierarchical systems such as shown in FIG. 5.

Figure 7:
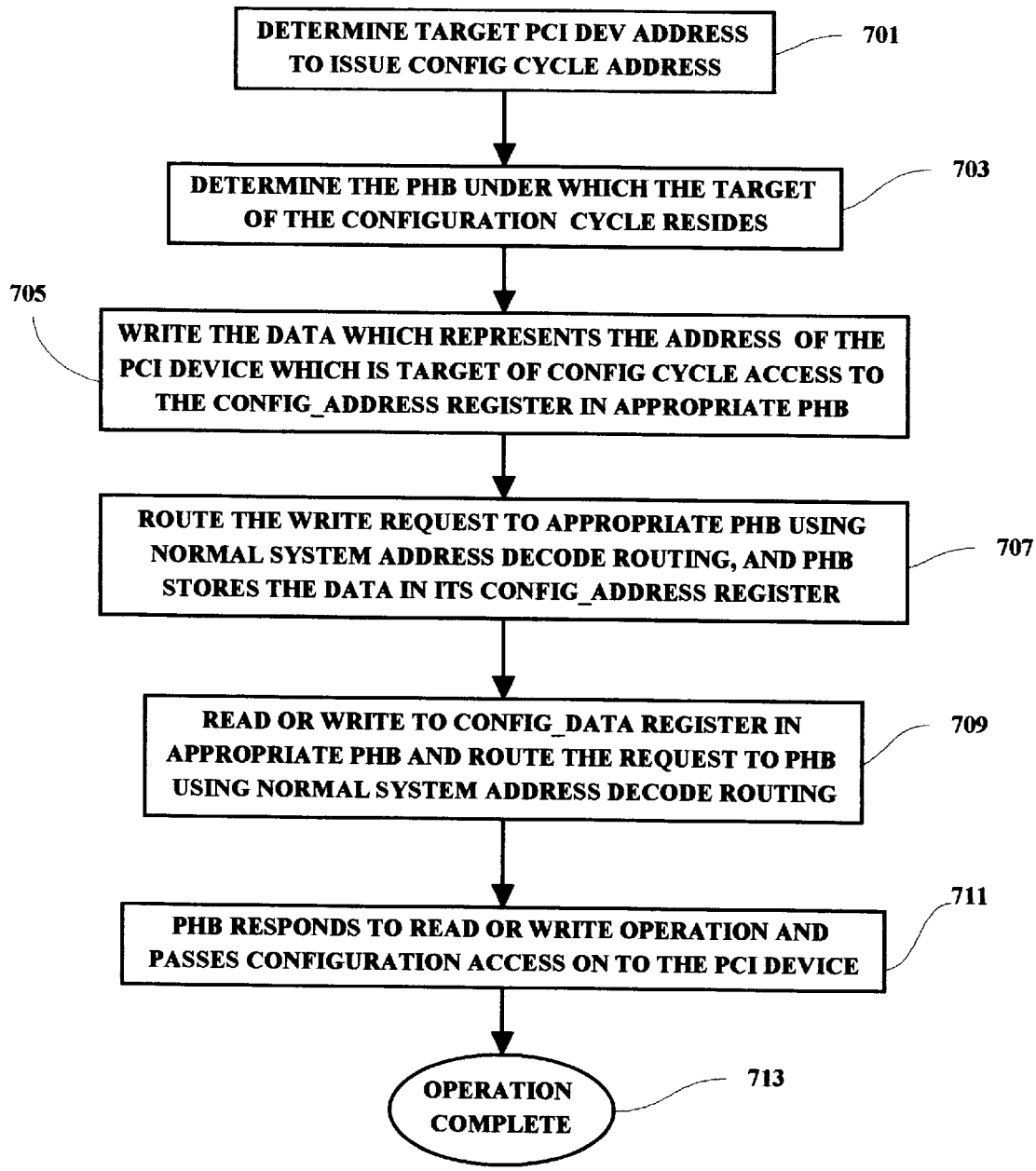
FIG. 7 is a flow chart illustrating an operational sequence using a scalable PCI hub architecture in accordance with the present invention.

The system shown in FIG. 5 operates in accordance with the flow chart illustrated in FIG. 7. In FIG. 7, a configuration program determines 701 a target PCI device to which the program wants to issue a Configuration Cycle access. Next, the program determines 703 the target PHB under which the target PCI device of the Configuration Cycle resides. The program then writes 705 the data which represents the address of the target PCI device to the CONFIG_ADDRESS register in the target PHB. That PCI address data consists of the PCI bus number, the device number, the function number and the register number. Next the system routes the write request 707 to the appropriate target PHB using normal system address decode routing, and the PHB stores the data in its CONFIG_ADDRESS register. The program then reads or writes 709 to the CONFIG_DATA register in the appropriate target PHB and the system routes the request to the target PHB using normal system address decode routing in the hub circuit 509 (FIG. 5). The target PHB then responds 711 to the read or write operation and passes configuration access cycle on to the target PCI device as the process completes 713.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for performing a configuration cycle access to a target Peripheral component Interconnect (PCI) device in a computer system, said computer system including a system bus and a predetermined number of PCI host bridge circuits, each of said PCI host bridge circuits having means for coupling to at least one PCI device under said PCI host bridge circuit, said computer system further including a hub circuit connecting said PCI host bridge circuits to said system bus, said method comprising:

determining a target PCI host bridge under which said target PCI device resides;

routing a write request for PCI address data representing an address of said target PCI device to a configuration address register in said target PCI host bridge through said hub circuit using system address decode routing;

storing data to be written in said configuration address register of said target PCI bridge circuit address register; and performing a functional operation to a configuration data register in said target PCI host bridge, said functional operation being routed to said target PCI host bridge through said hub circuit using said system address decode routing.

2. The method as set forth in claim 1 wherein said functional operation is a read operation.

3. The method as set forth in claim 1 wherein said functional operation is a write operation.

4. The method as set forth in claim 1 wherein said method further includes:

responding by said target PCI host bridge to said functional operation; and passing said configuration cycle access to said target PCI device.

5. The method as set forth in claim 4 wherein said functional operation is a read operation.

6. The method as set forth in claim 4 wherein said functional operation is a write operation.

7. The method as set forth in claim 1 wherein said PCI address data includes a PCI bus number representative of a PCI bus below said target PCI host bridge.

8. The method as set forth in claim 7 wherein said PCI address data further includes a PCI device number representative of said target PCI device.

9. The method as set forth in claim 8 wherein said PCI address data further includes a function number representative of a type of function for said target PCI device.

10. The method as set forth in claim 9 wherein said PCI address data further includes a register number representative of an address register in said target PCI host bridge.

* * * * *